US012800464B2

(12) United States Patent
Liu et al.

(10) Patent No.: US 12,800,464 B2
(45) Date of Patent: Nov. 17, 2026

(54) METHOD TO DETERMINE FORMATION BREAKDOWN OVERPRESSURE CONSIDERING ROCK'S BRITTLENESS

(71) Applicant: ARAMCO SERVICES COMPANY, Houston, TX (US)

(72) Inventors: Chao Liu, Brookshire, TX (US); Dung T. Phan, Brookshire, TX (US); Younane N. Abousleiman, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 783 days.

(21) Appl. No.: 18/324,586

(22) Filed: May 26, 2023

(65) Prior Publication Data

US 2024/0393226 A1 Nov. 28, 2024

(51) Int. Cl.
*G01N 15/08* (2006.01)
*E21B 47/06* (2012.01)

(52) U.S. Cl.
CPC ........... *G01N 15/088* (2013.01); *E21B 47/06* (2013.01)

(58) Field of Classification Search
CPC ........ G01N 15/088; E21B 47/06; E21B 43/26
See application file for complete search history.

(56) References Cited

U.S. PATENT DOCUMENTS

| | | | | |
|---|---|---|---|---|
| 10,935,481 | B2 | 3/2021 | Allo et al. | |
| 2018/0094514 | A1* | 4/2018 | Leem | E21B 43/26 |

FOREIGN PATENT DOCUMENTS

| | | | | | |
|---|---|---|---|---|---|
| CN | 103344705 | B | | 6/2015 | |
| CN | 104677734 | A | | 6/2015 | |
| CN | 103122762 | B | | 7/2015 | |
| CN | 105221141 | B | | 8/2016 | |
| CN | 106097125 | A | | 11/2016 | |
| CN | 104407381 | B | | 1/2017 | |
| CN | 105626025 | B | | 5/2018 | |
| CN | 105675635 | B | | 6/2018 | |
| CN | 108104804 | A | * | 6/2018 | E21B 43/26 |
| CN | 106547034 | B | | 11/2018 | |
| CN | 110320571 | A | | 10/2019 | |
| CN | 106872260 | B | | 11/2019 | |
| CN | 110596165 | A | | 12/2019 | |
| CN | 107290219 | B | | 4/2020 | |

(Continued)

OTHER PUBLICATIONS

English machine translation of Zhao et al. (CN108104804A) (Year: 2018).*

(Continued)

*Primary Examiner* — Walter L Lindsay, Jr.
*Assistant Examiner* — Geoffrey T Evans
(74) *Attorney, Agent, or Firm* — Osha Bergman Watanabe & Burton LLP

(57) ABSTRACT

Systems and methods for determining breakdown overpressure are disclosed. The methods may include obtaining a borehole radius and a porosity value in a borehole; determining a rock brittleness index value from the porosity value; determining a breakdown overpressure radius from the rock brittleness index value and the borehole radius; and determining a breakdown overpressure from the breakdown overpressure radius. The methods may further include planning a fracking operation in a well based on the determined breakdown overpressure.

17 Claims, 6 Drawing Sheets

(56) References Cited

FOREIGN PATENT DOCUMENTS

| | | | |
|---|---|---|---|
| CN | 109164499 | B | 4/2020 |
| CN | 111027882 | A | 4/2020 |
| CN | 111691864 | A | 9/2020 |
| CN | 108363110 | B | 10/2020 |
| CN | 110275202 | B | 12/2020 |
| CN | 112255159 | B | 8/2021 |
| CN | 113236217 | A | 8/2021 |
| CN | 111271055 | B | 10/2021 |
| CN | 112987125 | B | 12/2021 |
| CN | 113030440 | B | 2/2022 |
| CN | 111366448 | B | 4/2022 |
| CN | 112304754 | B | 8/2022 |
| CN | 114034619 | B | 8/2022 |

OTHER PUBLICATIONS

Glorioso J. et al., "Unconventional reservoirs: Basic petrophysical concepts for shale gas", SPE 153001, Paper presented at the SPE/EAGE European Unconventional Resources Conference and Exhibition held in Vienna, Austria, Mar. 20-22, 2012 (38 pages).

Hiramatsu Y. et al., Stress around a shaft or level excavated in ground with a three-dimensional stress state. Memoirs of the Faculty of Engineering, Kyoto University. 24(1), 56-76 (1962) (2 pages).

Mews K. et al., "A review of brittleness index correlations for unconventional tight and ultra-tight reservoirs", Geosciences, 9(7), 319 (2019) (20 pages).

Ye, Y. et al., "Brittleness Evaluation in Shale Gas Reservoirs and its Influence on Fracability", Energies, vol. 13, Issue 2, Jan. 13, 2020 (22 pages).

Lai, J. et al., "Brittleness index estimation in a tight shaly sandstone reservoir using well logs", Elsevier, Journal of Natural Gas Science and Engineering, vol. 27, Part 3, Nov. 2015, pp. 1536-1545 (10 pages).

Chong, Z. et al., "Effect of rock brittleness on propagation of hydraulic fractures in shale reservoirs with bedding-planes", Energy Science & Engineering, vol. 8, Issue 7, Mar. 11, 2020 (37 pages).

Gholami, R. et al., "Brittleness of gas shale reservoirs: a case study from the North Perth basin, Australia", Elsevier, Engineering, vol. 33, Jul. 2016 (29 pages).

Kenomore, M., Doctor of Philosophy of the University of Portsmouth, "Shale Gas Characterization and Production Forecasting: A Case Study on UK Bowland Shale and the US Barnett Shale", Jun. 2020 (182 pages).

Kong, M. et al., "Rock Mechanical Properties and Breakdown Pressure of High-Temperature and High-Pressure Reservoirs in the Southern Margin of Junggar Basin", Hindawi, Geofluids, vol. 2021, Article ID 1116136, Dec. 29, 2021 (22 pages).

Office Action issued in Saudi Arabian Application No. 1020242853, mailed on Dec. 7, 2025 (8 pages).

* cited by examiner

METHOD TO DETERMINE FORMATION BREAKDOWN OVERPRESSURE CONSIDERING ROCK'S BRITTLENESS

BACKGROUND

The accurate determination of breakdown overpressure is of great importance in multi-stage hydraulic fracturing operations in various rock formations, such as shale and sandstone. Underestimation of formation breakdown overpressure may lead to poor hydraulic fracturing, while overestimation may result in economic inefficiency.

Some mechanisms that determine formation breakdown overpressure include the stress field around the borehole, poroelastic effects, thermal effects, rock strength, and filter cake buildup at the borehole wall. Rock brittleness is another essential parameter controlling breakdown overpressure, but has not been extensively investigated in the published literature.

Accordingly, there exists a need for systems and methods to determine a formation breakdown overpressure based on the brittleness of rock formations near the borehole wall.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, one or more embodiments of the techniques described herein relate to a method, including obtaining a borehole radius and a porosity value in a borehole; determining a rock brittleness index value from the porosity value; determining a breakdown overpressure radius from the rock brittleness index value and the borehole radius; determining a breakdown overpressure from the breakdown overpressure radius; and planning a fracking operation in a well based on the determined breakdown overpressure.

In some aspects, one or more embodiments of the techniques described herein relate to a non-transitory computer-readable memory including computer-executable instructions stored thereon that, when executed on a processor, cause the processor to perform steps including: obtaining a borehole radius and a porosity value in a borehole; determining a rock brittleness index value from a porosity measurement; determining a breakdown overpressure radius from the rock brittleness index value and a borehole radius; determining a breakdown overpressure from the breakdown overpressure radius; and planning a fracking operation in a well based on the determined breakdown overpressure.

In some aspects, one or more embodiments of the techniques described herein relate to a system, including: a core sampling system, configured to obtain a rock sample from a formation; a laboratory tool configured to analyze the rock sample, and configured to determine a reference rock brittleness index value from the rock sample; and a computer system operatively connected to the laboratory tool and a well logging tool, configured to: obtaining a borehole radius and a porosity value in a borehole; determining a rock brittleness index value from a porosity measurement; determining a breakdown overpressure radius from the rock brittleness index value and the borehole radius; determining a breakdown overpressure from the breakdown overpressure radius; and planning a fracking operation in a well based on the breakdown overpressure.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, shapes of the elements as drawn are not necessarily intended to convey any information regarding the actual shape of the elements and have been solely selected for ease of recognition in the drawing.

DETAILED DESCRIPTION

Figure 1:
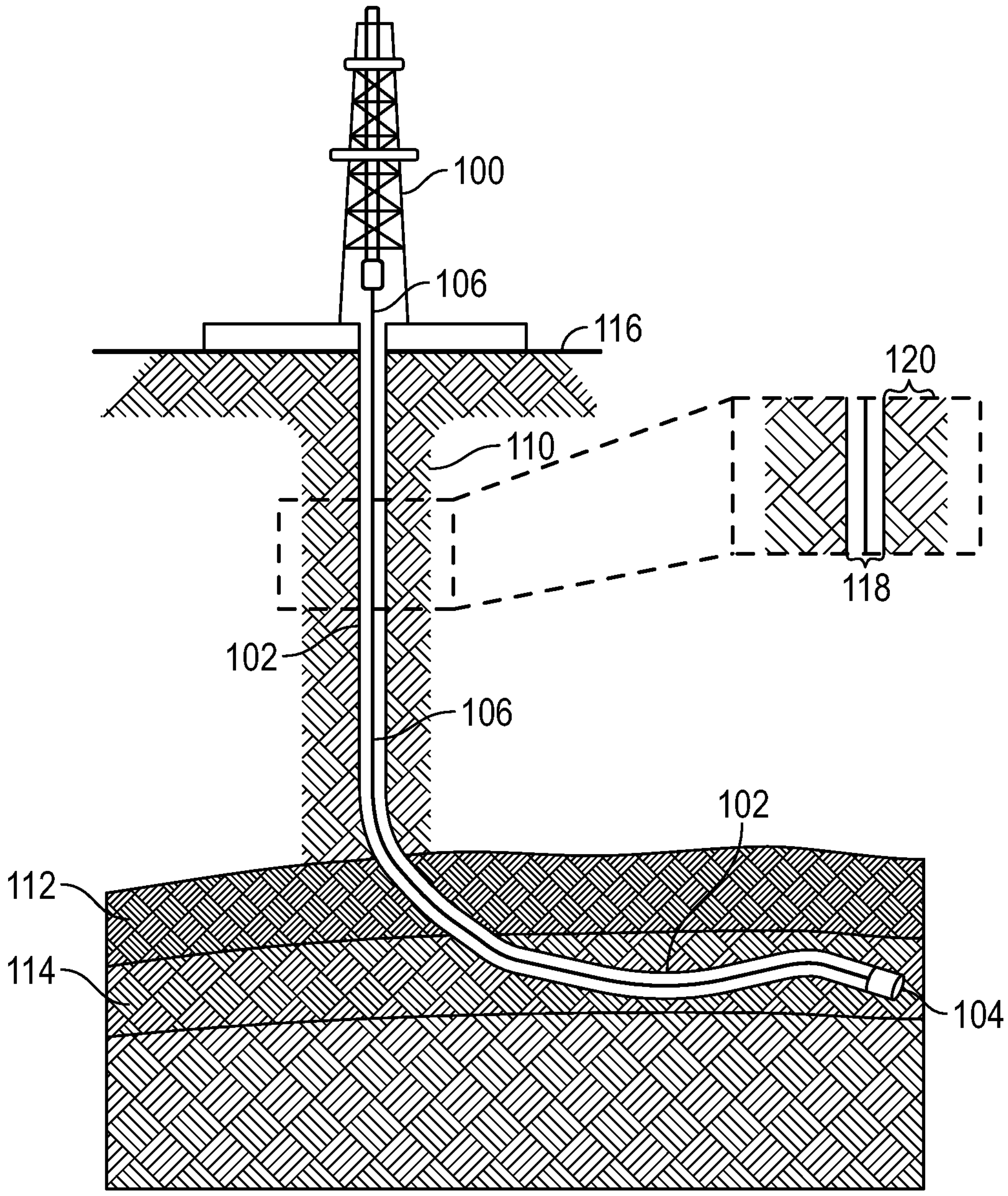
FIG. 1 shows a drilling system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "breakdown overpressure" includes reference to one or more of such pressures.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

Broadly contemplated herein, in accordance with one or more embodiments, are systems and a method to determine a formation breakdown overpressure based on the brittleness of rock near the borehole wall.

Embodiments of the present disclosure may provide at least one of the following advantages. Rock brittleness values may be obtained from laboratory measurements via a core sampling system that analyzes rock samples brought out of a well, or in situ by using well logging tools. The values may then be used to determine a radial distance at which to calculate a breakdown overpressure. This radial distance may be modeled to decrease linearly with an increase of rock brittleness. To determine the linear relation, the field-measured breakdown overpressure and an associated rock brittleness value are determined at a reference location. Once this linear relation is determined, it may be used to calculate the breakdown overpressure at a determined radial distance at all other locations in a borehole.

In the following description of FIGS. 1-6, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

FIG. 1 illustrates systems in accordance with one or more embodiments. Specifically, FIG. 1 shows a well (102) that may be drilled by a drill bit (104) attached by a drillstring (106) to a drill rig (100) located on the surface of the earth (116). The borehole (118) corresponds to the uncased portion of the well (102). The borehole (118) of the well (102) may traverse a plurality of overburden layers (110) and one or more cap-rock layers (112) to a hydrocarbon reservoir (114). Along with the radius of the borehole (118), R, a radial distance (120), r, may be measured from the borehole (118) wall into a rock formation. Once drilled, a well (102) may be sealed, pressurized, and fractured.

Figure 2:
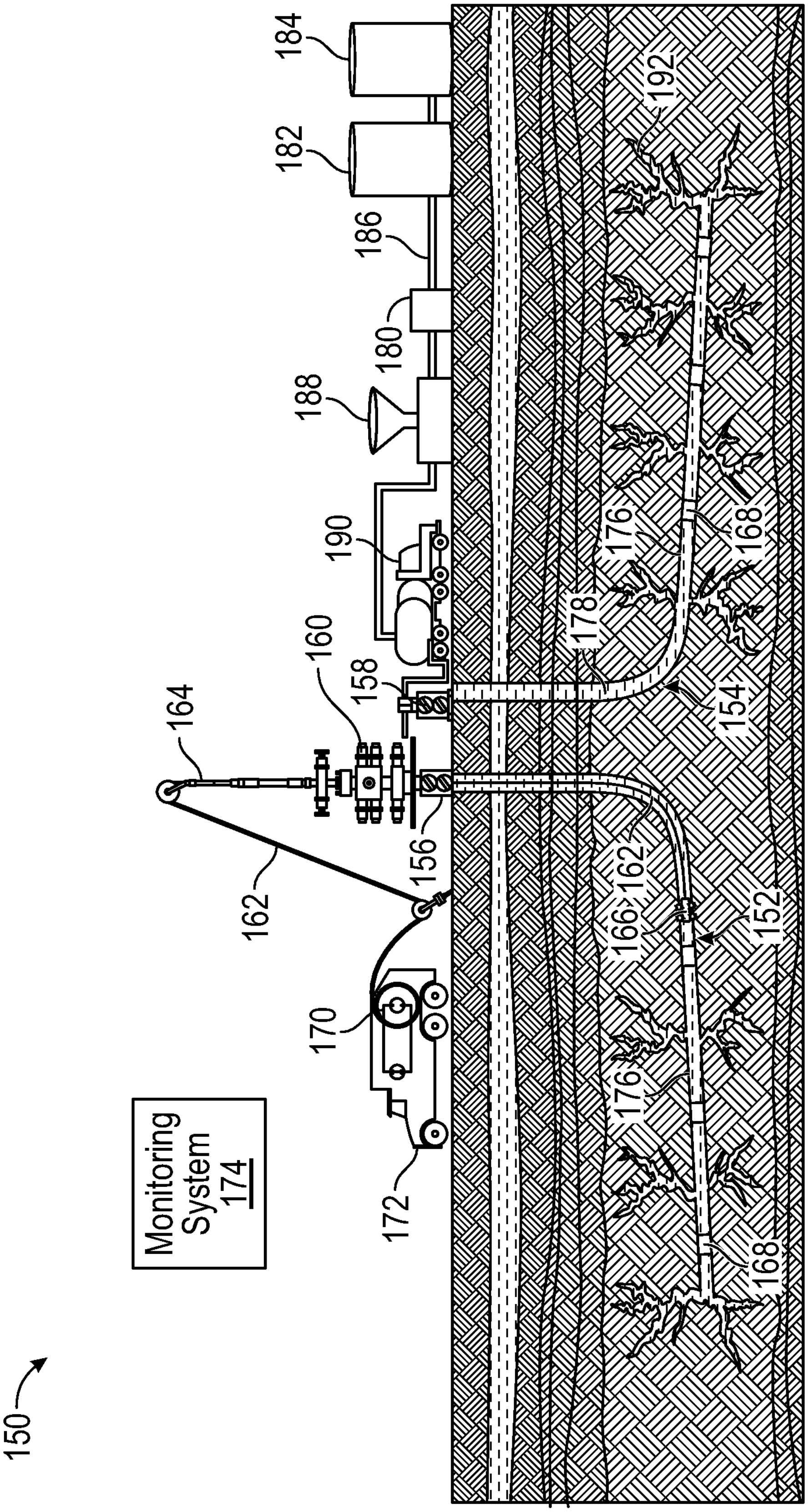
FIG. 2 shows a fracking system in accordance with one or more embodiments.

FIG. 2 shows a hydraulic fracturing site (150) undergoing a hydraulic fracturing operation in accordance with one or more embodiments. The particular hydraulic fracturing operation and hydraulic fracturing site (150) shown is for illustration purposes only. The scope of this disclosure is intended to encompass any type of hydraulic fracturing site (150) and hydraulic fracturing operation. In general, a hydraulic fracturing operation includes two separate operations: a perforation operation and a pumping operation.

In further embodiments, a hydraulic fracturing operation is performed in stages and on multiple wells (102) that are geographically grouped. A singular well (102) may have anywhere from one to more than forty stages. Typically, each stage includes one perforation operation and one pumping operation. While one operation is occurring on one well (102), a second operation may be performed on the other well (102). As such, FIG. 2 shows a hydraulic fracturing operation occurring on a first well (152) and a second well (154). The first well (152) is undergoing the perforation operation and the second well (154) is undergoing the pumping operation.

The first well (152) and the second well (154) are horizontal wells (102), meaning that each well (102) includes a vertical section and a lateral section. The lateral section is a section of the well (102) that is drilled at least eighty degrees from vertical. The first well (152) is capped by a first frac tree (156) and the second well (154) is capped by a second frac tree (158). A frac tree (156, 158) is similar to a Christmas/production tree but is specifically installed for the hydraulic fracturing operation. Frac trees (156, 158) tend to have larger bores and higher-pressure ratings than a Christmas/production tree would have. Further, hydraulic fracturing operations require abrasive materials being pumped into the well (102) at high pressures, so the frac tree (156, 158) is designed to handle a higher rate of erosion.

In accordance with one or more embodiments, the first well (152) and the second well (154) each require four stages. Both the first well (152) and the second well (154) have undergone three stages and are undergoing the fourth stage. The second well (154) has already undergone the fourth stage perforation operation and is currently undergoing the fourth stage pumping operation. The first well (152) is undergoing the fourth stage perforating operation and has yet to undergo the fourth stage pumping operation.

In accordance with one or more embodiments, the perforating operation includes installing a wireline blow out preventor (BOP) (160) onto the first frac tree (156). A wireline BOP (160) is similar to a drilling BOP; however, a wireline BOP (160) has seals designed to close around (or shear) wireline (162) rather than drill pipe. A lubricator (164) is connected to the opposite end of the wireline BOP (160). A lubricator (164) is a long, high-pressure pipe used to equalize between downhole pressure and atmosphere pressure in order to run downhole tools, such as a perforating gun (166), into the well (102).

The perforating gun (166) is pumped into the first well (152) using the lubricator (164), wireline (162), and fluid pressure. In accordance with one or more embodiments, the perforating gun (166) is equipped with explosives and a frac plug (168) prior to being deployed in the first well (152). The wireline (162) is connected to a spool (170) often located on a wireline truck (172). Electronics (not pictured) included in the wireline truck (172) are used to control the unspooling/spooling of the wireline (162) and are used to send and receive messages along the wireline (162). The electronics may also be connected, wired or wirelessly, to a monitoring system (174) that is used to monitor and control the various operations being performed on the hydraulic fracturing site (150).

When the perforating gun (166) reaches a predetermined depth, a message is sent along the wireline (162) to set the frac plug (168). After the frac plug (168) is set, another message is sent through the wireline (162) to detonate the explosives, as shown in FIG. 2. The explosives create perforations in the casing (176) and in the surrounding formation. There may be more than one set of explosives on a singular perforation gun (166), each detonated by a distinct message. Multiple sets of explosives are used to perforate different depths along the casing (176) for a singular stage. Further, the frac plug (168) may be set separately from the perforation operation without departing from the scope of the disclosure herein.

As explained above, FIG. 2 shows the second well (154) undergoing the pumping operation after the fourth stage perforating operation has already been performed and perforations are left behind in the casing (176) and the surrounding formation. A pumping operation includes pumping a frac fluid (178) into the perforations in order to propagate the perforations and create fractures (192) in the surrounding formation. The frac fluid (178) often comprises a certain percentage of water, proppant, and chemicals.

FIG. 2 further shows chemical storage containers (180), water storage containers (182), and proppant storage containers (184) located on the hydraulic fracturing site (150). Frac lines (186) and transport belts (not pictured) transport the chemicals, proppant, and water from the storage containers (180, 182, 184) into a frac blender (188). A plurality of sensors (not pictured) are located throughout this equipment to send signals to the monitoring system (174). The monitoring system (174) may be used to control the volume of water, chemicals, and proppant used in the pumping operation.

The frac blender (188) blends the water, chemicals, and proppant to become the frac fluid (178). The frac fluid (178) is transported to one or more frac pumps, often pump trucks (190), to be pumped through the second frac tree (158) into the second well (154). Each pump truck (190) includes a pump designed to pump the frac fluid (178) at a certain pressure. More than one pump truck (190) may be used at a time to increase the pressure of the frac fluid (178) being pumped into the second well (154). The frac fluid (178) is transported from the pump truck (190) to the second frac tree (158) using a plurality of frac lines (186).

The fluid pressure propagates and creates the fractures (192) while the proppant props open the fractures (192) once the pressure is released. Different chemicals may be used to lower friction pressure, prevent corrosion, etc. The pumping operation may be designed to last a certain length of time to ensure the fractures (192) have propagated enough. Further the frac fluid (178) may have different make ups throughout the pumping operation to optimize the pumping operation without departing from the scope of the disclosure herein.

Breakdown overpressure is the pressure in the subsurface at which a rock will fracture, and may change from location to location in a borehole (118). In fracking operations, where the borehole (118) is pressurized to induce fracturing and produce gas, it useful to estimate this parameter. Underestimating its value means one will bring too few pumps/pump trucks (190) and fail to generate meaningful fractures, thus lessening the effectiveness of the fracturing operation. Overestimating means bringing too many pumps/pump trucks (190), thus increasing costs and lessening the economic benefits. In order to determine a breakdown overpressure, it is useful to first characterize the stress field in the vicinity of the borehole (118).

Linear elastic solutions of total stresses around an inclined borehole (118) are as follows:

$$\sigma_{rr} = \left(1 + \frac{3R^4}{r^4} - \frac{4R^2}{r^2}\right)\sigma_d \cos 2(\theta - \theta_r) + \left(1 - \frac{R^2}{r^2}\right)\sigma_m + P_w \frac{R^2}{r^2} \tag{1}$$

$$\sigma_{\theta\theta} = -\left(1 + \frac{3R^4}{r^4}\right)\sigma_d \cos 2(\theta - \theta_r) + \left(1 + \frac{R^2}{r^2}\right)\sigma_m - p_w \frac{R^2}{r^2} \tag{2}$$

$$\sigma_{zz} = S_z - 4v\frac{R^2}{r^2}\sigma_d \cos 2(\theta - \theta_r) \tag{3}$$

$$\sigma_{r\theta} = -\left(1 - \frac{3R^4}{r^4} + \frac{2R^2}{r^2}\right)\sigma_d \sin 2(\theta - \theta_r) \tag{4}$$

$$\sigma_{\theta z} = (-S_{xz}\sin\theta + S_{yz}\cos\theta)\left(1 + \frac{R^2}{r^2}\right) \tag{5}$$

$$\sigma_{rz} = (S_{xz}\cos\theta + S_{yz}\sin\theta)\left(1 - \frac{R^2}{r^2}\right) \tag{6}$$

where $$\theta_r = \frac{1}{2}\arctan\frac{2S_{xy}}{S_{xx} - S_{yy}},\ \sigma_m = \frac{S_{xx} + S_{yy}}{2},\ \sigma_d = \sqrt{\left(\frac{S_{xx} - S_{yy}}{2}\right)^2 + S_{xy}^2},\ S_{ij}$$

are the stress components in the far-field, θ is the borehole angle, R is the borehole radius, and $p_w$ is the borehole pressure.

A material is defined to be brittle if it fractures when subjected to a tensile stress with little elastic deformation, or with small plastic deformation. In contrast, a material is defined to be ductile when it can sustain plastic deformation under tensile stress before it fractures. For example, glass is brittle and rubber is ductile. FIG. 2 illustrates the stress-strain response of a brittle material (200) contrasted against the stress-strain response of a ductile material (202). The vertical axis (204) indicates stress and the horizontal axis (206) indicates strain.

Rock brittleness may be dependent on its constituents, such as minerals, clay, organic matter, etc. A brittleness index, BI, may be used to quantify rock brittleness. Various formulae have been proposed estimate BI. For example, the following equation may, without limitation, be used to estimate rock brittleness based on the minerals it contains:

$$BI = \frac{\text{Quartz} + \text{Carbonate}}{\text{Quartz} + \text{Carbonate} + \text{Clay} + TOC} \tag{7}$$

where TOC is the total organic carbon content, and the names of the minerals stand for the weight fractions of the corresponding minerals.

BI can also be calculated from well logs with the following equation:

$$BI = -1.5314 \times NPHI + 0.8575 \tag{8}$$

where NPHI are values from a neutron porosity log.

To determine the BI of a rock, we can measure its mineral weight fractions in the laboratory and then use Eq. (7) or use a neutron porosity log and Eq. (8). BI ranges from 0 (ductile) to 1 (brittle). Measuring of the brittleness index of the rock at a radial distance (120) away from the borehole (118) wall is useful to calculate a breakdown overpressure at which the fracturing will occur. If BI=1, the breakdown overpressure is calculated at the borehole wall with borehole radius, R; if BI<1, it is calculated at some breakdown overpressure radius, $r_B$, larger than the borehole radius. $r_B$ increases as BI decreases. Put another way, the more ductile a formation is (i.e., the lower the BI), the further into the formation the fracturing will occur—hence the need to calculate the breakdown overpressure at the radial distance (120) $r_B$.

A simple linear relation characterizes the relationship between the brittleness index, the borehole radius, R, and the breakdown overpressure radius, $r_B$:

$$r_B = (R - r_{B0})BI + r_{B0} \tag{9}$$

where the constant value, $r_{B0}$, is the value of $r_B$ when BI=0. In order for this equation to be useful, a value of $r_{B0}$ must be determined before applying the equation at the borehole (118) locations of interest.

Returning to the characterization of the stress field, in cylindrical borehole coordinates, stresses are expressed in matrix form as follows:

$$\begin{pmatrix} \sigma_{rr}(r, p_w) & \sigma_{r\theta}(r, p_w) & \sigma_{rz}(r, p_w) \\ \sigma_{r\theta}(r, p_w) & \sigma_{\theta\theta}(r, p_w) & \sigma_{\theta z}(r, p_w) \\ \sigma_{rz}(r, p_w) & \sigma_{\theta z}(r, p_w) & \sigma_{zz}(r, p_w) \end{pmatrix} \tag{10}$$

Diagonalizing this matrix one obtains:

$$\begin{pmatrix} \sigma_1(r, p_w) & 0 & 0 \\ 0 & \sigma_2(r, p_w) & 0 \\ 0 & 0 & \sigma_3(r, p_w) \end{pmatrix} \tag{11}$$

where $\sigma_1$, $\sigma_2$, and $\sigma_3$ are the minimal, intermediate, and maximum principal stresses. The effective principal stresses are defined by $$\sigma_i'(r, p_w) = \sigma_i(r, p_w) - Pp, \quad i = 1, 2, 3 \tag{12}$$

where Pp is the pore pressure.

The breakdown overpressure at radial distance (120) r may then be determined from the following equation:

$$\sigma_i'(r, p_B) + TS = \sigma_1(r, p_B) - Pp + TS = 0 \tag{13}$$

In Eq. (13), TS is the tensile strength of the rock formation and $p_B$ is the breakdown overpressure. For a given breakdown overpressure, different algorithms may be used to obtain the value of r that satisfies $\sigma_1(r,p_B)$−Pp+TS=0, such as, without limitation, the bisection method or Newton's method.

Without limitation, a mini-frac test or a field hydraulic fracturing observation at an offset well (102) may be used determine the values of BI and $p_{B0}$ at a reference location. A typical mini-frac test showing the observed breakdown overpressure (300), $p_{B0}$, is presented in FIG. 3. The observed breakdown overpressure (300) is the inflection point of the curve. The vertical axis (302) is borehole pressure, the horizontal axis (304) is time.

Substitution of $p_{B0}$ obtained from a mini-frac test into Eq. (13) gives $$\sigma_1(r_B, p_{B0}) - Pp + TS = 0 \tag{14}$$

One can solve Eq. (14) for $r_B$. The known values of $r_B$, R, and BI may then be plugged into Eq. (9) to obtain $r_{B0}$. With $r_{B0}$ and R now fixed in Eq. (9), for any new value of BI, a radius, $r_B$, may be calculated. At a new location, the value of $r_B$ may then be plugged into Eq. (14), which is solved for $p_B$ at the new location.

Figure 4:
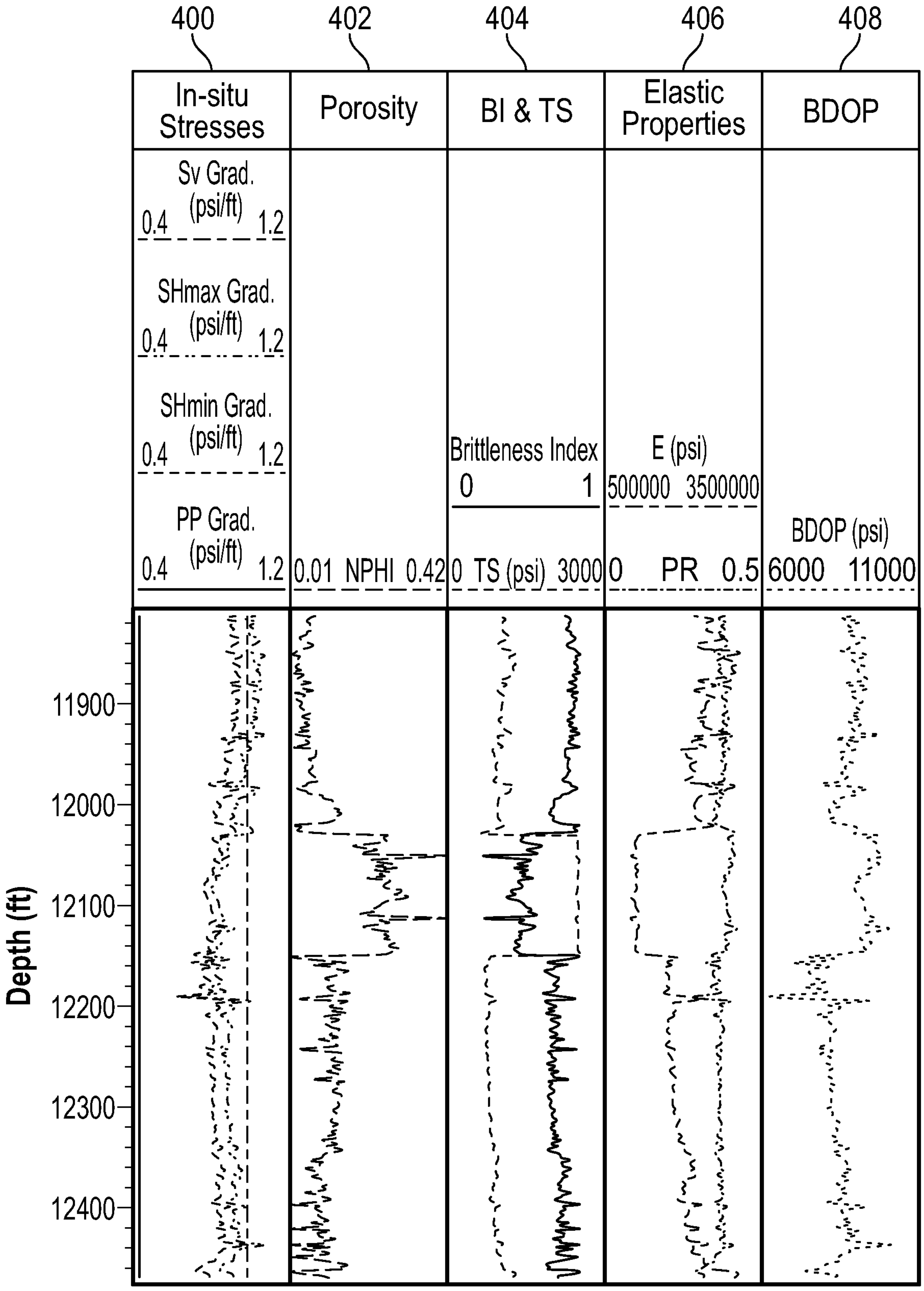
FIG. 4 shows results of the method to determine breakdown overpressure given in situ stress, brittleness index, tensile stress, porosity, and elastic properties along the path of a borehole in accordance with one or more embodiments.

The results of the above procedure are shown in FIG. 4. The vertical axis is depth in the borehole (118) and the first four sets of curves represent data from well logs. The first window (400) presents a set of curves for pore pressure gradient and in situ stress values: vertical shear stress, and minimum and maximum horizontal shear stresses. Pore pressure is equal to the pore pressure gradient multiplied by the depth. As such, the pore pressure is not constant in the borehole, but rather, increases as the depth increases. In this example shown in the first window (400), the pore pressure gradient is constant. The second window (402) shows porosity as measured by a neutron density log. The third window (404) shows values of the brittleness index, calculated from the neutron porosity via Eq. (8), and tensile stress. The fourth window (406) shows Young's modulus and Poisson's ratio of the rock. Young's modulus is not needed to calculate the breakdown pressure, but is shown here due to its common use in the field by engineers to determine rock stiffness. Poisson's ratio is used to calculate the axial stress, $\sigma_{zz}$, in Eq. (3). The fifth window (408) shows the breakdown overpressure (300) as calculated from Eq. (14) using the radius values obtained from Eq. (9).

Figure 3:
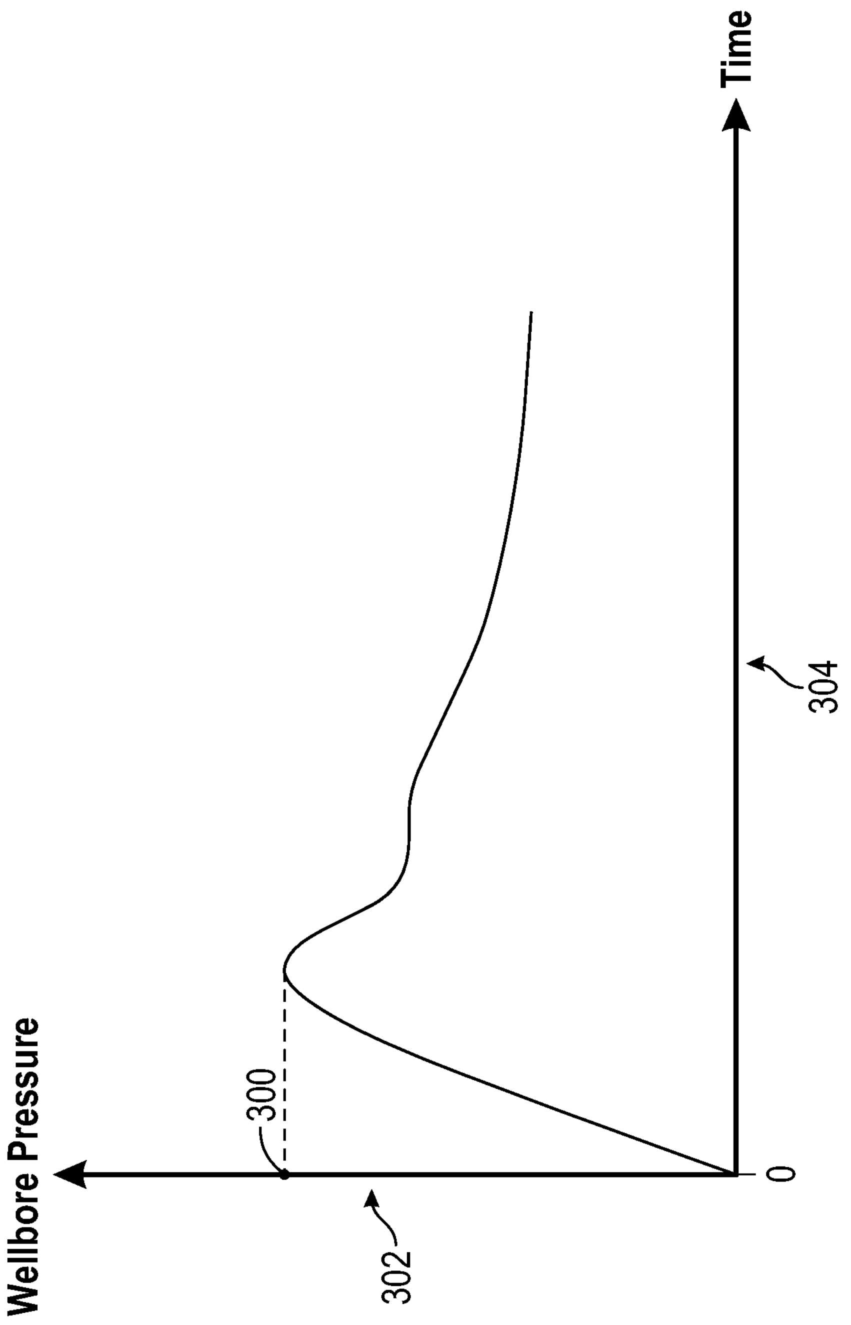
FIG. 3 shows a plot of borehole overpressure versus time for mini-frac experiment in accordance with one or more embodiments.
Figure 5:
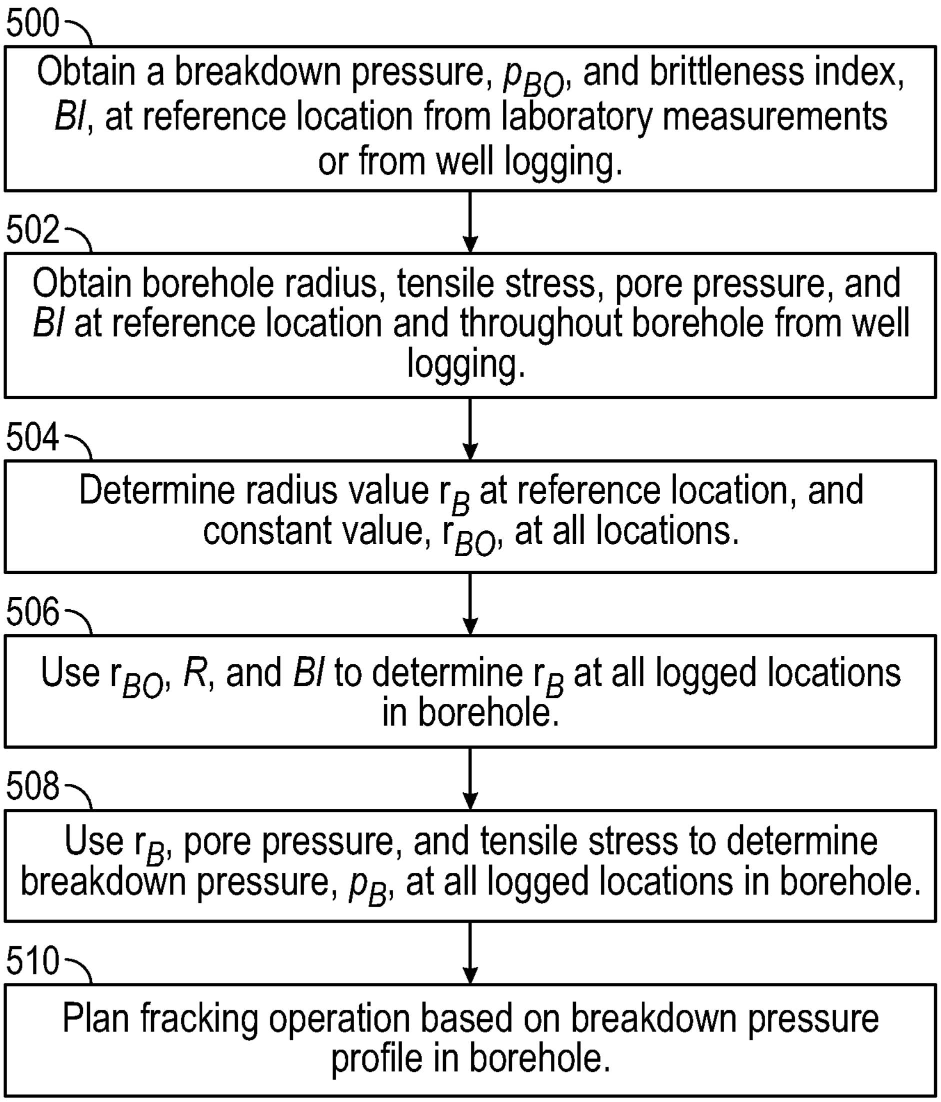
FIG. 5 presents a workflow of the method to determine breakdown overpressure in accordance with one or more embodiments.

FIG. 5 presents a workflow for the method which configured to be applied at a location where a fracking job is performed. First, in Step 500, a sample is drawn from the well (102) for conducting laboratory experiments to determine a reference breakdown overpressure (300), $p_{B0}$, of a rock formation, as illustrated in FIG. 3. In alternate embodiments, well logs may be used to determine a reference breakdown overpressure of the rock formation in the borehole. In Step 502, a reference brittleness index value, BI, is determined from the same sample or from the well log data. A reference borehole radius and reference values of tensile stress and pore pressure are also obtained at the same location from well log data. In Step 504, one may use $p_{B0}$, along with the reference tensile stress and the reference pore pressure in Eq. 14 to determine a value for the radius, $r_B$, at which to determine the breakthrough overpressure at the reference location. Then, using the reference borehole radius, TB, and Eq. 9 one may determine the constant value, $r_{B0}$, that can be used subsequently in calculations at all other locations.

In Step 506, BI, $r_{B0}$, and R, are used in Eq. 9 to determine $r_B$ at all logged locations in a borehole (118). In Step 508, the radial value $r_B$ may then be combined with pore pressure and tensile stress obtained from well logs to determine a breakdown overpressure (300), $p_B$, at all logged locations in the borehole (118) via Eq. 14. Having obtained a breakdown overpressure (300) at all locations in a borehole (118), in Step 510, a fracking operation may be planned that pressurizes the rock formation to an appropriate degree (i.e., one that does not over- or under-pressurize a rock formation of interest).

Figure 6:
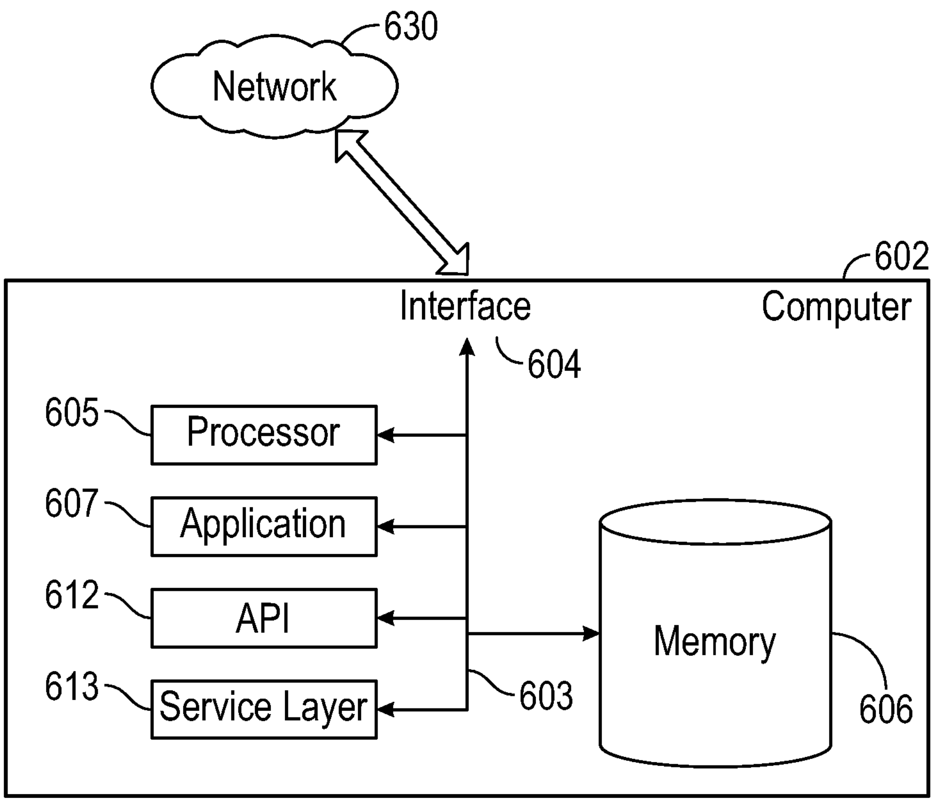
FIG. 6 shows a computer system in accordance with one or more embodiments.

FIG. 6 further depicts a block diagram of a computer system (602) used to provide computational functionalities associated with described algorithms, methods, functions, processes, flows, and procedures as described in this disclosure, according to one or more embodiments. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

For the purposes of this invention, a computer provides all functionality related to the calculations, including calculating the radius value, $r_B$, and solving Eq. 14 for the breakdown overpressure (300). A computer also provides all functionality for the manipulation of well data, all graphical capabilities, and assists the planning of a fracking operation.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:

obtaining a borehole radius and a porosity value in a borehole;

determining a rock brittleness index value from the porosity value;

determining a breakdown overpressure radius from the rock brittleness index value and the borehole radius;

determining a breakdown overpressure from the breakdown overpressure radius;

planning a fracking operation in a well based on the determined breakdown overpressure; and performing the planned fracking operation.

2. The method of claim 1, further comprising:

obtaining a reference borehole radius, a reference pore pressure, a reference tensile stress, a reference breakdown overpressure, and a reference rock brittleness index value in the borehole; and determining a reference breakdown overpressure radius from the reference breakdown overpressure, the reference pore pressure, and the reference tensile stress.

3. The method of claim 2, further comprising:

determining a constant value from the reference rock brittleness index value, the reference borehole radius, and the reference breakdown overpressure radius.

4. The method of claim 3, wherein the constant value is used to determine the breakdown overpressure radius.

5. The method of claim 1, further comprising obtaining a rock sample from a core sampling system, wherein at least one of the following is obtained from a laboratory measurement of the rock sample: a reference breakdown overpressure or a reference rock brittleness index value.

6. The method of claim 1, wherein a reference rock brittleness index value is determined from the porosity value.

7. A system, comprising:

a core sampling system, configured to obtain a rock sample from a well in a formation;

a laboratory tool configured to determine a rock brittleness index value from the rock sample;

a computer system operatively connected to the laboratory tool and a well logging tool, configured to:

obtain a borehole radius and a porosity value in a borehole;

determine the rock brittleness index value from the porosity value;

determine a breakdown overpressure radius from the rock brittleness index value and the borehole radius;

determine a breakdown overpressure from the breakdown overpressure radius; and plan a fracking operation in the well based on the breakdown overpressure; and a fracking system configured to perform the planned fracking operation.

8. The system of claim 7, wherein the computer system is further configured to obtain a reference borehole radius, a reference pore pressure, a reference tensile stress, a reference breakdown overpressure, and a reference rock brittleness index value in the borehole.

9. The system of claim 8, wherein the computer system is further configured to determine a reference breakdown overpressure radius from the reference breakdown overpressure, the reference pore pressure, and the reference tensile stress.

10. The system of claim 9, wherein the computer system is further configured to determine a constant value from the reference rock brittleness index value, the reference borehole radius, and the reference breakdown overpressure radius.

11. The system of claim 7, wherein the computer system is further configured to obtain a pore pressure and a tensile stress in the borehole.

12. The system of claim 7, wherein the computer system is further configured to determine a pore pressure and a tensile stress in the borehole.

13. The system of claim 7, wherein the computer system is further configured to obtain at least one of the following in the borehole: the borehole radius, a pore pressure, or a tensile stress.

14. The system of claim 7, wherein the laboratory tool is further configured to obtain at least one of the following from a laboratory measurement of the rock sample: a reference breakdown overpressure or a reference rock brittleness index value.

15. The system of claim 7, wherein the computer system is further configured to determine a reference rock brittleness index value.

16. The system of claim 7, wherein the computer system is further configured to determine a fluid pressure value for the fracking system.

17. The system of claim 16, wherein the computer system is further configured to use the breakdown overpressure to determine the fluid pressure value.

* * * * *